(12) United States Patent
Greenberg et al.

(10) Patent No.: US 11,555,896 B2
(45) Date of Patent: Jan. 17, 2023

(54) SYSTEM AND METHOD FOR GENERATING VERY LONG PPM WAVEFORMS

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 453 days.

(21) Appl. No.: 16/863,826

(22) Filed: Apr. 30, 2020

(65) Prior Publication Data

US 2021/0341579 A1    Nov. 4, 2021

(51) Int. Cl.
| | | |
|---|---|---|
| G01S 7/484 | (2006.01) | |
| G01S 17/10 | (2020.01) | |
| H04L 25/49 | (2006.01) | |

(52) U.S. Cl.
CPC .............. G01S 7/484 (2013.01); G01S 17/10 (2013.01); H04L 25/49 (2013.01); H04L 25/4902 (2013.01)

(58) Field of Classification Search
CPC ......... G01S 7/484; G01S 17/10; H04L 25/49; H04L 25/4902
See application file for complete search history.

(56) References Cited

U.S. PATENT DOCUMENTS

| | | |
|---|---|---|
| 4,527,276 A | 7/1985 | Gutleber |
| 5,786,788 A * | 7/1998 | Schober ............... G01S 13/288 342/162 |
| 9,858,304 B2 | 1/2018 | Marcus et al. |

(Continued)

FOREIGN PATENT DOCUMENTS

| | | |
|---|---|---|
| CN | 104730535 A | 6/2015 |
| CN | 104168066 B | 8/2016 |

(Continued)

OTHER PUBLICATIONS

Leukhin et al. (Binary Sequences with Minimum Peak Sidelobe Level up to Length 68, Povolgskii State Technical University, Date: Dec. 14, 2012) (Year: 2012).*
Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).
International Search Report for related International Application No. PCT/US2020/066481, filed Dec. 21, 2020, International Search Report dated Mar. 23, 2021 and dated Apr. 1, 2021 (5 pgs.).

(Continued)

*Primary Examiner* — Jennifer D Bennett
(74) *Attorney, Agent, or Firm* — Lewis Roca Rothgerber Christie LLP

(57) ABSTRACT

A lidar for generating long PPM waveforms receives an initial PPM code element including a number of code elements and a desired maximum sidelobe height; b) generates a two-column lookup table; c) selects a candidate modulation level; d) compares the values of the number of times a code element difference has been observed in the initial PPM code element from the lookup table against the desired maximum sidelobe height; e when a value of the number of times exceeds the desired maximum sidelobe height, discards the selected candidate modulation level, decrements corresponding values in the lookup table and repeats steps c to d; f otherwise, appends the selected candidate modulation level to the end of the initial PPM code element to update the initial PPM code element, and repeats steps c to f N times to generate a PPM waveform of length N.

14 Claims, 4 Drawing Sheets

(56) References Cited

U.S. PATENT DOCUMENTS

| | | | |
|---|---|---|---|
| 2012/0257186 A1 | 10/2012 | Rieger et al. | |
| 2013/0258312 A1* | 10/2013 | Lewis | G01S 7/4865 356/4.01 |
| 2017/0329010 A1 | 11/2017 | Warke et al. | |
| 2021/0124050 A1* | 4/2021 | Puglia | G01S 17/10 |

FOREIGN PATENT DOCUMENTS

| | | |
|---|---|---|
| EP | 1 884 800 A1 | 2/2008 |
| EP | 2 694 996 A1 | 2/2014 |
| EP | 3 508 872 A1 | 7/2019 |

OTHER PUBLICATIONS

Written Opinion of the International Searching Authority for related International Application No. PCT/US2020/066481, filed Dec. 21, 2020, Written Opinion of the International Searching Authority dated Apr. 1, 2021 (5 pgs.).

International Search Report for related International Application No. PCT/US2020/066666, filed Dec. 22, 2020, International Search Report dated Mar. 25, 2021 and dated Apr. 6, 2021 (4 pgs.).

Written Opinion of the International Searching Authority for related International Application No. PCT/US2020/066666, filed Dec. 22, 2020, Written Opinion of the International Searching Authority dated Apr. 6, 2021 (6 pgs.).

Bansal, S., et al., "Nature-inspired metaheuristic algorithms to find near-OGR sequences for WDM channel allocation and their performance comparison," Opten Math. 2017;15:520-547.

Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.

Erdos, P., et al., "On a Problem of Sidon in Additive Number Theory, and on Some Related Problems," Journal of the London Mathematical Society, vol. 16, 1941, 4 pages.

Fluckiger, D.U. et al., "Optimal pseudorandom pulse position modulation ladar waveforms," Applied Optics, Mar. 20, 2015, vol. 54, No. 9, 4 pages.

Gagliardi, R., et al., "Acquisition Sequences in PPM Communications", IEEE Transactions on Information Theory, vol. IT-33, No. 5, Sep. 1987, 7 Pages.

Hiskett, P.A., et al., "A photon-counting time-of-flight ranging technique developed for the avoidance of range ambiguity at gigahertz clock rates," Optics Express. Sep. 1, 2008, vol. 16, No. 18, 14 pages.

Mao, X., et al., "Pulse position modulation for compact all-fiber vehicle laser rangefinder development," OpticalEngineering. SPIEDigitalLibrary.org, 56(10), Oct. 2017, 9 pages.

Milstein, A.B., et al., "Acquisition algorithm for direct-detection ladars with Geiger-mode avalanche photodiodes," Applied Optics, vol. 47, No. 2, Jan. 10, 2008, 16 pages.

International Search Report for corresponding International Application No. PCT/US2020/066478, filed Dec. 21, 2020, International Search Report dated Mar. 26, 2021 and dated Apr. 8, 2021 (4 pgs.).

Written Opinion of the International Searching Authority for corresponding International Application No. PCT/US2020/066478, filed Dec. 21, 2020, Written Opinion of the International Searching Authority dated Apr. 8, 2021 (5 pgs.).

* cited by examiner

FIG. 4A

Initial Code [1 3 5]

| Difference | Occurrence |
|---|---|
| 2 | 2 |
| 4 | 1 |

FIG. 4B

Updates Code [1 3 5 9]

| Difference | Occurrence |
|---|---|
| 2 | 2 |
| 4 | 2 |
| 6 | 1 |
| 8 | 1 |

SYSTEM AND METHOD FOR GENERATING VERY LONG PPM WAVEFORMS

GOVERNMENT LICENSE RIGHTS

This invention was made with Government support. The Government has certain rights in the invention.

FIELD OF THE INVENTION

The disclosed invention relates generally to lidars; and more particularly to system and method for generating very long Pulse Position Modulated (PPM) lidar waveforms.

BACKGROUND

Pulsed laser radar sensors, also known as lidars or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. A key characteristic of these pulses is that they are each 1-25 nanoseconds in duration, so that the resulting range measurement may be accurate to within a few meters.

The receiver includes an optical system capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, needs to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive, and the energy required per pulse may exceed hardware constraints. If pulses are repeated at higher frequency, the integration time and pulse energy may decrease, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This nominal underlying position is determined by the pulse number divided by the reciprocal of the waveform's nominal Pulse Repetition Frequency (PRF). PPM encoding works adequately in some cases, but current methods of constructing these waveforms are computationally intensive and limited in applicability.

Some conventional techniques for determining time of flight from an extended pulsed waveform compute the cross-correlation between the transmit waveform and a set of recorded photodetection times. However, these techniques are limited to post-collection processing, which limits the speed at which range estimates may be determined. Furthermore, this method does not account for waveform compression or stretching due to target motion.

FIG. 1A shows a typical PPM waveform. As shown, unambiguous ranging can be accomplished with pulse position modulated codes, where pulse timings are encoded by dithering them from a nominal repetition frequency. FIG. 1B depicts a typical range determination from the PPM waveform of FIG. 1A. As depicted, range can then be unambiguously determined by cross-correlating return timings with transmit timings. The lag associated with the peak of the cross-correlation yields the target round trip time, $t_{RTT}$.

The total length of an optimal waveform, N, is related to the modulation pool size $j_{max}$. For example, a 20 kHz PRF with a $j_{max}$ that is 10% of the PRI and a 10 ns jitter resolution will yield an expected optimal waveform length of only ~200 elements. This means that the expected code length grows slowly with respect to the modulation pool size. In the above example, doubling the jitter resolution to 5 ns only increases the expected optimal waveform length to ~300 elements. Because these limits on waveform length originate from hardware constraints, they are very difficult to circumvent. However, some applications require extremely long codes. For instance, when the lidar link budget implies that a small fraction of transmitted photons will be returned to the observer, a large number of photons must be transmitted to collect sufficient signal. While the number of transmitted photons can be increased with additional laser amplification, this can lead to prohibitive increases in size, weight, power consumption, and cost. Longer dwells and/or higher pulse frequencies are often necessary, and both exacerbate the need for extended waveforms.

Therefore, there is sometimes need to generate waveforms that are too long to be optimal, but have very high peak-to-maximum-sidelobe ratios (PMSLR) nonetheless. Existing techniques have focused on generating multiple optimal code segments, and then "stitching" these segments together to generate a longer, sub-optimal code. The PMSLR of the resulting code can be moderately high, but is limited by its construction process. Because the "atomic units" of the code are unrelated pre-generated optimal segments, they tend to result in baud collisions that reduce PMSLR.

Other conventional approaches rely on pseudorandom methods for waveform generation. These methods solve the inverse problem for waveform creation by iteratively synthesizing a new waveform element, checking the resulting waveform for optimality, and then discarding the new element if optimality was not reached. However, under common conditions these techniques are limited to waveforms with a few hundred elements. The disclosed invention allows the creation of high-performance (but not strictly optimal) waveforms of lengths greater than $10^6$.

SUMMARY

In some embodiments, the disclosed invention is a method for generating long PPM waveforms in a lidar. The method includes: a) receiving an initial PPM code element and a desired maximum sidelobe height; b) generating a two-column lookup table, wherein one column of the lookup table includes differences between each code element and each of the other code elements, and the other column of the lookup table includes entries indicating a number of times a code element difference has been observed in the initial PPM code; c) selecting a candidate modulation level from a pool of available elements; d) identifying the differences between the selected candidate modulation value and each the code values in the initial PPM code and incrementing corresponding values in the lookup table; e) comparing the values of the lookup table against the desired maximum sidelobe height; f) when a value exceeds the desired maximum sidelobe height, discarding the candidate modulation level, decrementing the corresponding values in the lookup table and repeating steps c to e; g) when a value is below the desired maximum sidelobe height, appending the candidate modulation level to an end of the initial PPM code to update the initial code, and repeating steps c to g N times to generate a PPM waveform of length N, wherein N is an integer; h) transmitting the PPM waveform of length N by a transmitter toward a target; and i) receiving a waveform reflected from the target to determine the range to the target.

In some embodiments, the disclosed invention is a lidar for generating long PPM waveforms. The lidar includes: a processor for a) receiving an initial PPM code element and a desired maximum sidelobe height; b) generating a two-column lookup table, wherein one column of the lookup table includes differences between each code element and each of the other code elements, and the other column of the lookup table includes entries indicating a number of times a code element difference has been observed in the initial PPM code; c) selecting a candidate modulation level from a pool of available elements; d) identifying the differences between the selected candidate modulation value and each code values in the initial PPM code and incrementing corresponding values in the lookup table; e) comparing the values of the lookup table against the desired maximum sidelobe height; f) when a value exceeds the desired maximum sidelobe height, discarding the candidate modulation level, decrementing the corresponding values in the lookup table and repeating steps c to e; g) when a value is below the desired maximum sidelobe height, appending the candidate modulation level to an end of the initial PPM code to update the initial code, and repeating steps c to g N times to generate a PPM waveform of length N, wherein N is an integer. The lidar further includes a transmitter for transmitting the PPM waveform by the lidar toward a target; and a receiver for receiving a waveform reflected from the target to determine a range to the target.

The lookup table is a sparse representation of the autocorrelation function of the PPM waveform, and each difference between a code element and one of the other code elements in the lookup table represents the location of a nonzero sidelobe of the autocorrelation function and a corresponding value of the lookup table is a height of the sidelobe.

BRIEF DESCRIPTION OF THE DRAWINGS

These and other features, aspects, and advantages of the disclosed invention will become better understood with regard to the following description, appended claims, and accompanying drawings.

FIGS. 4A and 4B show an exemplary lookup table, according to some embodiments of the disclosed invention.

DETAIL DESCRIPTION

In some embodiments, the disclosed invention efficiently generates practical, long ranging waveforms with very high peak-to-maximum-sidelobe ratio (PMSLR) for transmit power-limited lidar systems. In some embodiments, the disclosed invention calculates codes by starting with a base (initial) code and iteratively expanding it. At each iteration, a modulation value is selected from the modulation pool. The base (initial) code may be trivial or a non-empty code to be built upon. The modulation value is then added as a new candidate code element, and the autocorrelation function of the resulting code is update by incrementing sidelobes associated with the candidate element. If any sidelobes exceed the specified maximum height, then the new code element is discarded, the modulation value is removed from the pool, and another modulation value is selected. Otherwise, the new code element is kept, and the process is repeated.

This way, in contrast to the conventional methods that recalculate the autocorrelation of the code for every element from scratch, the disclosed approach uses the previous values in a lookup table to efficiently calculate only the modified heights of sidelobes affected by the current candidate element. In some embodiments, the disclosed invention is utilized for generating very long waveforms that do not need to be optimal, but must still have extremely high PMSLRs.

Figure 1A:
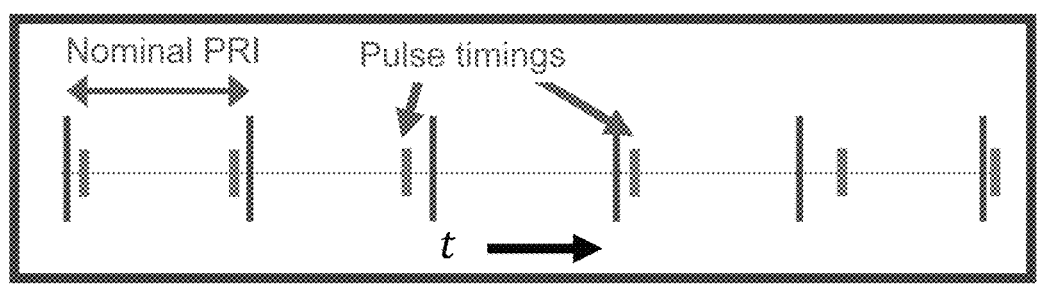
FIG. 1A shows a typical PPM waveform.
Figure 1B:
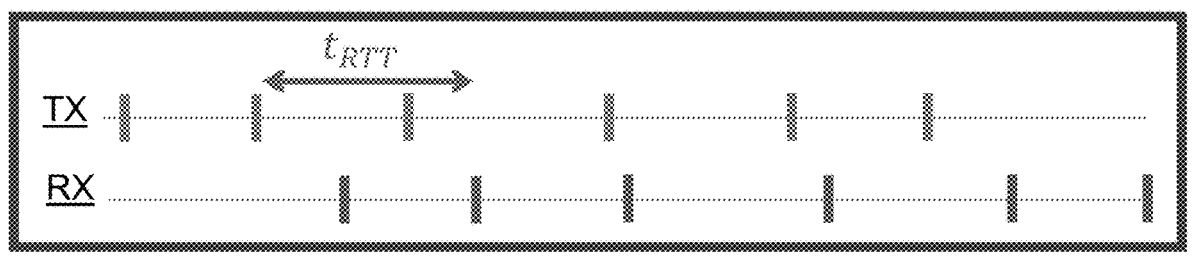
FIG. 1B depicts a typical range determination from the PPM waveform of FIG. 1A.
Figure 2:
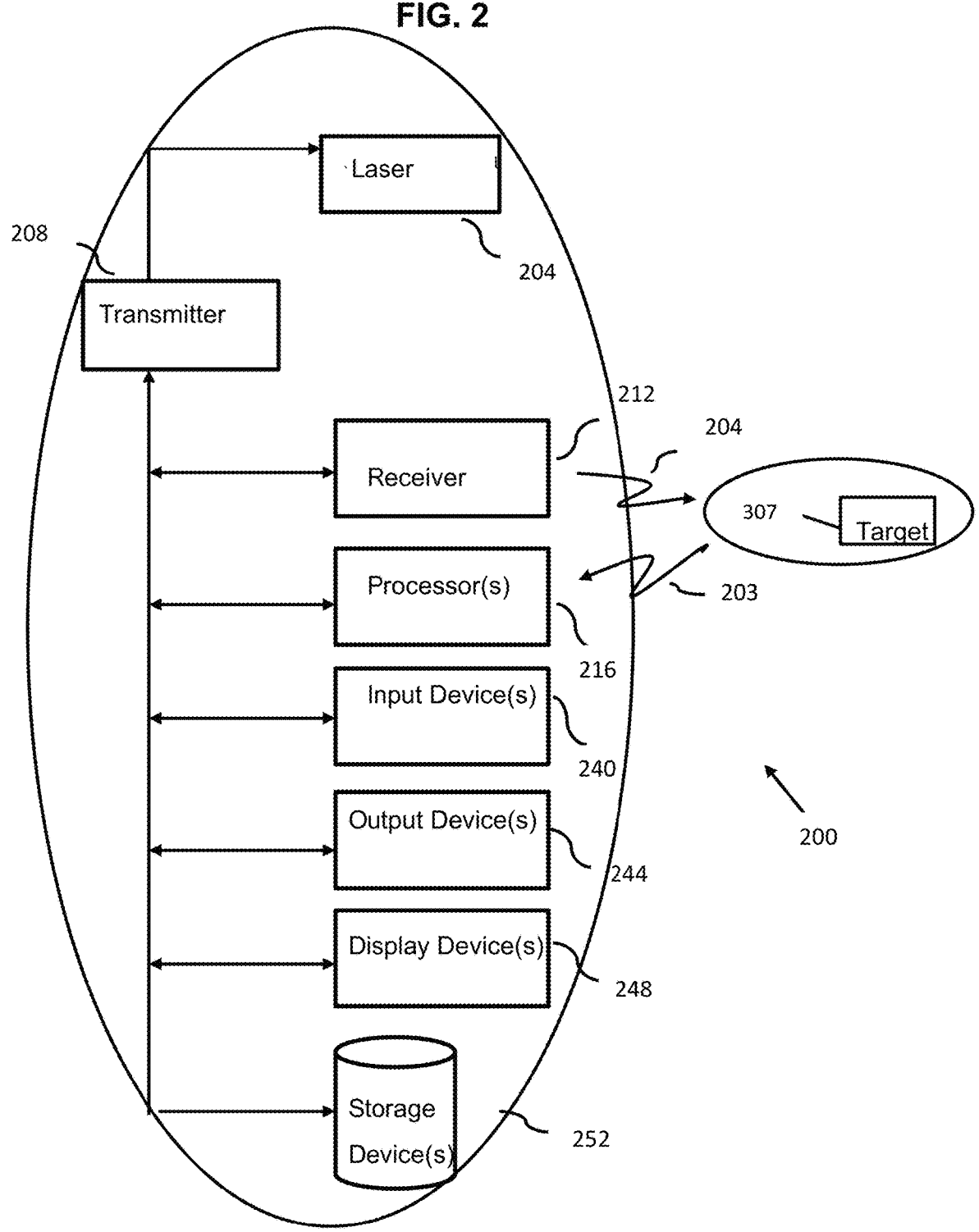
FIG. 2 is a system block diagram of an exemplary lidar system, according to some embodiments of the disclosed invention.

FIG. 2 is a system block diagram of an exemplary lidar system 200, according to some embodiments of the disclosed invention. As shown, a lidar platform includes a laser 204, a transmitter 208 and receiver 212. The transmitter 208 sends lidar transmission pulses 224 towards one or more targets 207 within a region of interest. lidar return pulses (samples) 203 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) frequency shifted due to target motion, and 3) attenuated by some factor. The receiver observes a return signal consisting of each of the target echoes (plus random noise).

System 200 also includes one or more input devices 240, one or more output devices 244, one or more display devices 248, one or more processors 216, and one or more storage devices 252. The modules and devices described herein can, for example, utilize the one or more processors 216 to execute computer executable instructions and/or the modules and devices described herein and may include their own processor to execute computer executable instructions. As known in the art, the one or more processors 216 include their own memories, such as RAMs and ROMs to store and execute program instructions. One skilled in the art would understand that the system 200 can include, for example, other modules, devices, and/or processors known in the art and/or varieties of the described modules, devices, analog-to digital converters (ADCs), digital-to-analog converters (DACs), and/or processors.

The input devices 240 receive information from a user (not shown) and/or another computing system (not shown). The input devices 240 can include, for example, Bluetooth interface, WiFi interface, network interface, a keyboard, a scanner, a microphone, a stylus, a touch sensitive pad or display. The output devices 244 output information associated with the system 200 (e.g., information to remote devices, information to a speaker, information to a display, for example, graphical representations of information). The processors 216 execute instructions for the system (e.g., applications). The storage devices 252 store a variety of information/data, including lidar range data generated by the system 200 and prior measurements including the lookup table of autocorrelations of the code. The display devices 248 display information associated with the system 200, for example, target information including their position, distance, type and the like, status information, configuration information and the like. The storage devices 252 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processor(s) 216, utilizing some or all of the components illustrated in FIG. 2.

Figure 3:
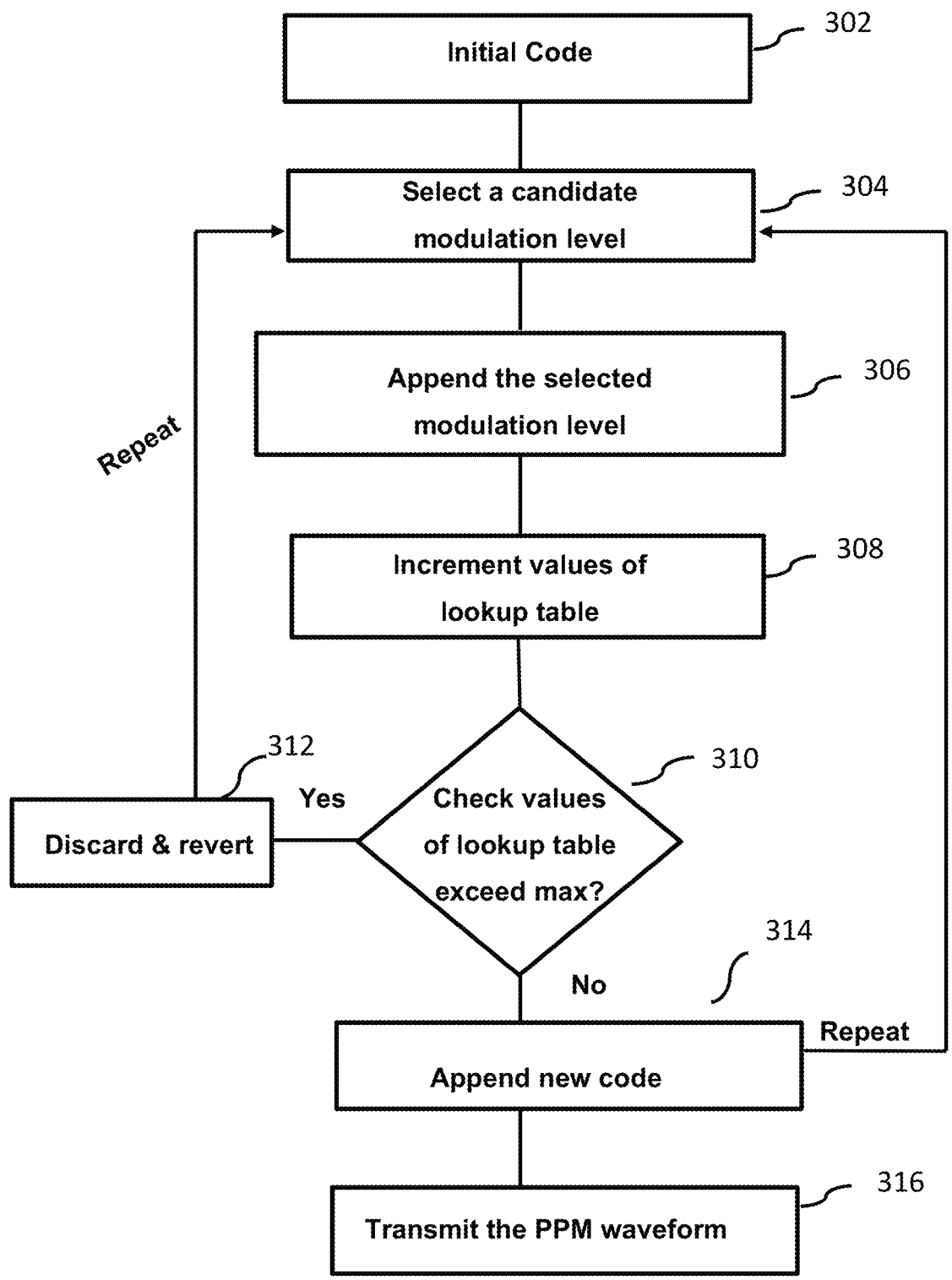
FIG. 3 is an exemplary process flow block diagram for generating PPM waveforms, according to some embodiments of the disclosed invention.

FIG. 3 is an exemplary process flow block diagram for generating PPM waveforms, according to some embodiments of the disclosed invention. As shown in block 302, an initial PPM code is supplied, which may include a single code element, along with a desired maximum sidelobe height, based on system requirements.

In block 304, a candidate modulation level is selected from the pool of available modulation levels (modulation pool) and is used to define a new PPM code element for the waveform to be generated. In block 306, the selected modulation level is appended to the end of the initial PPM code. In block 308, a lookup table is provided and the values of a lookup table are incremented, at keys (addresses) corresponding to the differences in the updated code FIGS. 4A and 4B show an exemplary lookup table, according to some embodiments of the disclosed invention. As shown, in the two-column lookup table, one column includes differences between each code element and each of the other code elements, and the other column includes entries indicating a number of times a code element difference has been observed in the initial PPM code. This way, the lookup table is a collection of key/value pairs, where the keys are distinct differences between code elements, and the values indicate the number of times each difference has been encountered. This table is a sparse representation of the waveform's autocorrelation function, where each difference represents the location of a nonzero sidelobe of the auto-correlation function, and the corresponding value of the lookup table is the height of that sidelobe. As know if the art, autocorrelation is the correlation of a signal with a delayed copy of itself as a function of delay. Informally, it is the similarity between observations as a function of the time lag between them. The analysis of autocorrelation is a mathematical tool for finding repeating patterns, such as the presence of a periodic signal obscured by noise, or identifying the missing fundamental frequency in a signal implied by its harmonic frequencies.

A known method for computing a cross-correlation between a first sequence and a second sequence includes: generating a first index vector based on the first sequence, the first index vector including a plurality of first elements, the first index vector excluding indices of zero valued elements of the first sequence; generating a second index vector based on the second sequence, the second index vector including a plurality of second elements, the second index vector excluding indices of zero valued elements of the second sequence; computing a plurality of pairwise differences between each of first elements of the first index vector and each of the second elements of the second index vector; and binning the plurality of pairwise differences to generate the cross-correlation of the first sequence and the second sequence.

Referring back to FIGS. 4A and 4B, using the differences between code elements to address the table minimizes memory usage and access time. For example, as shown in FIG. 4A, for an initial code of [1 3 5], the differences are 5−3=2, 3−1=2, and 5−1=4. Thus, the lookup table includes the differences 2 and 4, with occurrences 2 and 1, respectively. When a new element is appended to the code, new differences are calculated and the lookup table is incremented accordingly. For example, if a 9 is appended to the initial code, the new differences computed are 9−5=4, 9−3=6, and 9−1=8, so the lookup table entry for a difference of 4 is incremented to value of 2, and new entries with value 1 are initialized for new differences of 6 and 8, as shown in FIG. 4B.

Referring back to FIG. 3, the occurrence values in the lookup table are then compared to the desired maximum sidelobe height, in block 310. If any occurrence value exceeds the desired maximum sidelobe height, then the candidate element is discarded, the new lookup table entries are reverted (decremented back to the previous state), and the process is repeated from block 304, as shown in block 312. Otherwise, in block 314, the new code element is kept and appended to the end of the PPM code to make the PPM code longer by that one element. The process in blocks 304 to 314 is repeated N times to generate a PPM waveform with length N. The generated waveform of length N is then transmitted towards a target, by a transmitter, in block 316. The waveform is then reflected from the target and the range to the target is calculated by the well-known methods.

By storing only, the sidelobe locations and incrementing their heights only as needed, this technique reduces runtime requirements to $O(N^2)$, a significant improvement over the $O(N^3 \log N)$ scaling applicable to conventional techniques. It also reduces memory usage from $O(N^2)$ for conventional techniques to $O(N)$. In addition, this process can be configured to calculate occurrences only for differences less than a specified maximum, corresponding to a maximum target range of interest. When employed, this maximum range criterion reduces runtime requirements to $O(N)$.

The following is an exemplary pseudo-code for the above process, according to some embodiments of the disclosed invention. The process starts with an initial optimal PPM code, $P_0$, of length N, and a lookup-table $H_A$, keyed (addressed) by pulse time differences, and with values equal to the autocorrelation sidelobe height at the corresponding key/lag. The inputs also include an initial list of available modulation levels (i.e., the modulation pool) $j_0$, the nominal PRI, $T_{PRI}$, a maximum target range, $N_{corr}$, in units of $$\frac{c}{2} \times T_{PRI},$$

a maximum desired code length, $N_{max}$, and a maximum desired sidelobe height, m.

```
While N < N_max and j is non-empty
    Increment N
    Let j := j_0
    Let i_0 := max(1, N - N_corr)
    While length(P_0) = N - 1 and j is non-empty
        Select a candidate jitter value, j_c, at random from j
        Define a new code element, P_0(N) := N T_PRI + j_c
        Define an empty list of differences, d
        For i = i_0 to N - 1
            Append P_0(N) - P_0(i) to the end of d
            Increment the value at H_A(P_0(N) - P_0(i))
            If H_A(P_0(N) - P_0(i)) > m
                Decrement all values at H_A(d)
                Remove j_c from j
                Remove the last element of P_0
                Exit for-loop
        End for-loop
    End while-loop
End while-loop
```

Because the maximum sidelobe height can be specified with this technique (via the parameter m), codes can be generated with any desired length, N, and PMSLR, simply by specifying $N_{max}$=N and m=N/PMSLR. For example, the disclosed invention generates a 100,000-element code with a PMSLR=6700, with a runtime under three minutes on a conventional desktop workstation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended drawings and claims.

What is claimed is:

1. A method for generating long Pulse Position Modulated (PPM) waveforms in a lidar, the method comprising:
    a) receiving an initial PPM code element and a desired maximum sidelobe height, the initial PPM code element including a plurality of code elements;
    b) generating a two-column lookup table, wherein one column of the lookup table includes differences between each code element in the initial PPM code element and each of the remaining code elements in the initial PPM code element, and the other column of the lookup table includes entries indicating a number of times a code element difference has been observed in the initial PPM code element;
    c) selecting a candidate modulation level from a pool of available modulation levels;
    d) comparing values of the number of times a code element difference has been observed in the initial PPM code element from the lookup table against the desired maximum sidelobe height;
    e) when a value of the number of times exceeds the desired maximum sidelobe height, discarding the selected candidate modulation level, decrementing corresponding values in the lookup table and repeating steps c to d;
    f) when a value of the number of times is below the desired maximum sidelobe height, appending the selected candidate modulation level to an end of the initial PPM code element to update the initial PPM code element, and repeating steps c to f N times to generate a PPM waveform of length N, wherein N is an integer;
    g) transmitting the PPM waveform of length N by a transmitter toward a target; and
    h) receiving a waveform reflected from the target to determine a range to the target.

2. The method of claim 1, wherein the initial PPM code element includes a single code element and the desired maximum sidelobe height, based on system requirements.

3. The method of claim 1, wherein when the selected candidate modulation level is appended to the end of the initial PPM code element, new differences between the selected candidate modulation level and each of the code values are calculated and the lookup table is incremented accordingly.

4. The method of claim 1, wherein a runtime for performing steps c to g is $O(N^2)$.

5. The method of claim 1, wherein a memory usage from for performing steps c to g is $O(N)$.

6. The method of claim 1, wherein the lookup table is a sparse representation of an autocorrelation function of the PPM waveform, and wherein each difference between the code element and one of the other code elements in the lookup table represents the location of a nonzero sidelobe of the autocorrelation function and the corresponding value of the lookup table is a height of the sidelobe.

7. The method of claim 1, further comprising using the differences between code elements to address the lookup table.

8. A lidar for generating long Pulse Position Modulated (PPM) waveforms comprising:
    a processor for a) receiving an initial PPM code element and a desired maximum sidelobe height; b) generating a two-column lookup table, wherein one column of the lookup table includes differences between each code element in the initial PPM code element and each of the remaining code elements in the initial PPM code element, and the other column of the lookup table includes entries indicating a number of times a code element difference has been observed in the initial PPM code element; c) selecting a candidate modulation level from a pool of available modulation levels; d) comparing values of the number of times a code element difference has been observed in the initial PPM code element from the lookup table against the desired maximum sidelobe height; e) when a value exceeds the desired maximum sidelobe height, discarding the selected candidate modulation level, decrementing corresponding values in the lookup table and repeating steps c to e; f) when a value is below the desired maximum sidelobe height, appending the selected candidate modulation level to an end of the initial PPM code element to update the initial PPM code element, and repeating steps c to f N times to generate a PPM waveform of length N, wherein N is an integer;
    a transmitter for transmitting the PPM waveform by the lidar toward a target; and
    a receiver for receiving a waveform reflected from the target to determine a range to the target.

9. The lidar of claim 8, wherein the initial PPM code element includes a single code element and the desired maximum sidelobe height, based on system requirements.

10. The lidar of claim 8, wherein when the selected candidate modulation level is appended to the end of the initial PPM code element, the processor calculates new differences between the selected candidate modulation level and each of the code values and increments the lookup table accordingly.

11. The lidar of claim 8, wherein a runtime for performing steps c to g by the processor is $O(N^2)$.

12. The lidar of claim 8, wherein a memory usage for performing steps c to g is $O(N)$.

13. The lidar of claim 8, wherein the lookup table is a sparse representation of an autocorrelation function of the PPM waveform, and wherein each difference between the code element and one of the other code elements in the lookup table represents the location of a nonzero sidelobe of the autocorrelation function and the corresponding value of the lookup table is a height of the sidelobe.

14. The lidar of claim 8, wherein the processor uses the differences between code elements to address the lookup table.

* * * * *